Figure 1:
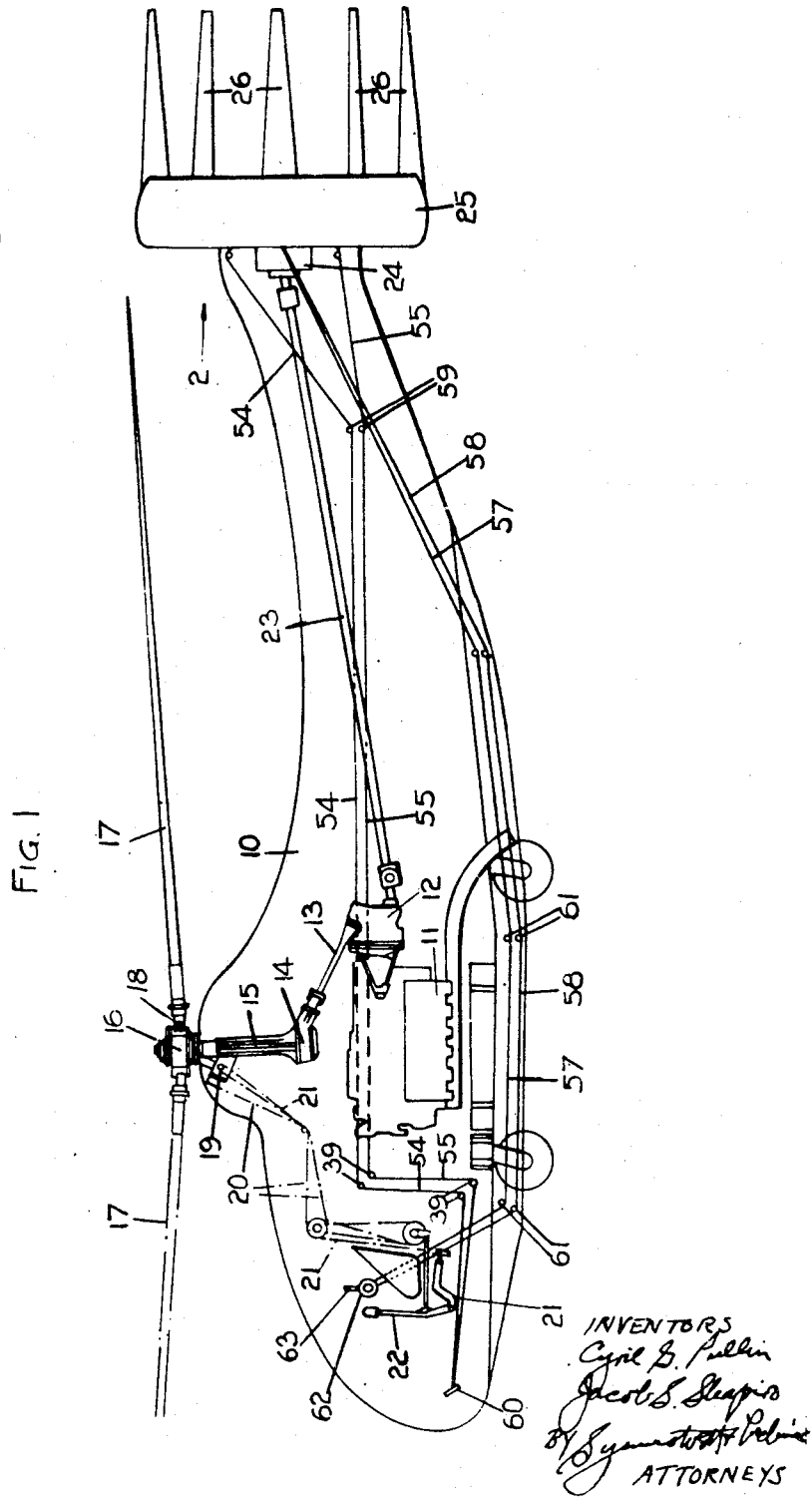

April 9, 1957    C. G. PULLIN ET AL    2,788,075
HELICOPTER WITH PADDLE WHEEL TYPE TAIL ROTOR Original Filed Oct. 9, 1945    5 Sheets-Sheet 1

April 9, 1957 C. G. PULLIN ET AL 2,788,075
HELICOPTER WITH PADDLE WHEEL TYPE TAIL ROTOR
Original Filed Oct. 9, 1945 5 Sheets-Sheet 4

INVENTORS
Cyril G. Pullin
Jacob S. Shapiro
BY
ATTORNEYS

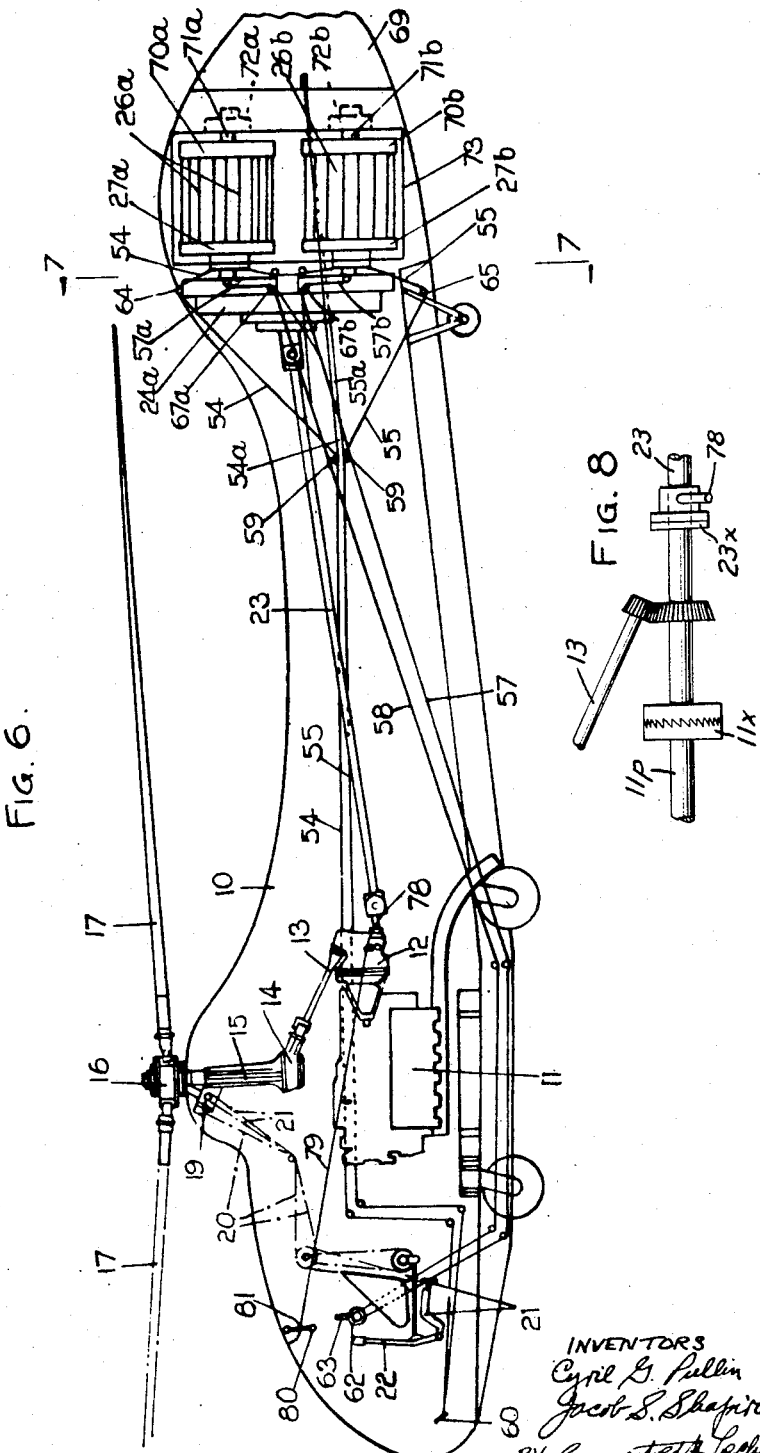

United States Patent Office 2,788,075
Patented Apr. 9, 1957

2,788,075

HELICOPTER WITH PADDLE WHEEL TYPE TAIL ROTOR

Cyril George Pullin, Moseley, Birmingham, and Jacob Samuel Shapiro, London, England, assignors, by mesne assignments, to Autogiro Company of America, Philadelphia, Pa., a corporation of Delaware Continuation of application Serial No. 621,230, October 9, 1945. This application January 29, 1952, Serial No. 268,769

Claims priority, application Great Britain October 11, 1944

14 Claims. (Cl. 170—135.24)

This invention relates to helicopters and this application is a continuation of our application Number 621,230, filed October 9, 1945, now abandoned.

The main object of the invention is the improvement of helicopter control, especially by combining or coordinating, with the main motor control effects (laterally and longitudinally, by corresponding movements of a pilot's control), of certain auxiliary rotor effects, including compensating the torque-reaction of the lifting rotor system, controlling the aircraft in yaw especially at low forward speeds and when hovering or rising or descending vertically, and trimming the aircraft longitudinally, for which purpose (in the preferred embodiment) we employ, in place of the usual air-screw-type torque-correcting rotor, one or more auxiliary rotors of the "paddle-wheel" type with its or their axis or axes substantially in the fore and aft plane of symmetry.

A further object concerns the improvement of control in yaw at high as well as at low forward speeds for which purpose we may employ a conventional rudder whose controls may be coupled to those of the paddle-wheel auxiliary rotor; and the rotors, which are both so positioned as to be autorotationally actuated, may be provided with means for disconnecting the drive, as hereinafter mentioned, whereby autorotation of both the main rotor system and the auxiliary rotor system can be had, upon engine failure, and complete control of the aircraft may be assured under all conditions.

The "paddle-wheel rotor" consists of a number of aerofoils arranged parallel to the rotary axis and equally spaced therefrom and from one another. These aerofoils are pivotally supported in one or more wheel frames mounted on the axle member and by means of appropriate linkages are compelled to oscillate about spanwise axes defined by their pivotal mountings with a frequency of once per revolution of the main axle. The amplitude and phasing of these oscillations are regulated by the kinematics of the linkages. The latter is so devised that the phasing of all the aerofoils (hereinafter referred to as blades) is the same.

Such an arrangement will produce a thrust at right angles to the rotary axis in a direction depending on the phasing of the oscillations and on the direction relative to the rotary axis of the general airstream in which the device is immersed.

In order to vary the thrust of the auxiliary rotor to conform with variations of the torque reaction of the main rotor system and to provide control in yaw, and in order to vary the direction of the auxiliary-rotor thrust, so as to provide a variable upward or downward thrust component for control in pitch or for trimming purposes, controllable means are preferably provided for varying the amplitude and phasing of the blade oscillation of the auxiliary rotor. The magnitude of the thrust developed by the auxiliary rotor depends on the amplitude of oscillation and on the power input, which in turn depends on the revolutions per minute and on the amplitude of oscillation. If the auxiliary rotor is driven through an auxiliary transmission by the main power plant driving the main lifting rotor system, the rotational speed of the auxiliary rotor is fixed by that of the main rotor system, which is approximately constant, unless variable speed gearing is embodied in the auxiliary rotor transmission. Such mechanism may be provided for this purpose, but to avoid the complication and weight of variable speed gearing it is preferable to vary the power input of the auxiliary rotor, and thereby vary its thrust, by varying the amplitude of oscillation of the auxiliary rotor blades. The maximum usable amplitude is limited by the requirement that the blades must not stall.

Irrespective of whether or not the auxiliary transmission includes a variable speed gear, it preferably includes a clutch for disconnecting the auxiliary rotor, as it is contemplated that a helicopter according to this invention should be provided with a conventional rudder. The latter provides more economical compensation (from the power-expenditure aspect) of the torque reaction of the lifting rotor system than the auxiliary rotor, when the aircraft is in forward flight (cruising, all out level flight, shallow dive or climb). In this condition the auxiliary rotor would be unclutched from the power plant and the conventional rudder would then furnish the required control of the aircraft in yaw. As the paddle wheel type of rotor has no tendency to auto-rotate under purely axial flow it will automatically slow down and stop rotating when unclutched, so that provision for positively arresting and locking it is not essential, but may be made if considered advisable in any particular project. Since in vertical ascent or descent, in hovering and in forward flight at slow speed, control in yaw is obtained by varying the auxiliary-rotor thrust, whereas in forward flight (except at slow speeds) it is preferably obtained from a conventional rudder, it is convenient to connect both the rudder and the appropriate auxiliary-rotor control, in parallel, into the yawing control circuit operated by conventional pedals or rudder bar.

The conventional rudder may also be required for control in yaw when the aircraft is gliding or sinking with the main rotor system autorotating, i. e., behaving as a gyroplane, in which event the main rotor system will be unclutched from or overrunning its transmission and the auxiliary rotor: if the main rotor system were not then disconnected from the auxiliary rotor, the power to drive the latter would be derived from the autorotation of the main system and thus would detract from its performance as a gyroplane system. In steep gliding gyroplane descent, however, the relative wind component across the axis of the auxiliary rotor will cause it to autorotate and deliver thrust, the direction of which may be varied (by controlling the phasing of the blade oscillation) to obtain a variable yawing component.

A single auxiliary rotor of relatively large projected area (span × diameter) may be employed, in which case a conventional fin and rudder may be positioned in front of it to avoid the shrouding effect of the auxiliary rotor.

Alternatively one or more smaller auxiliary rotors may be mounted in front of a rudder, the required thrust being obtained by driving them at a higher speed than that appropriate to a large single rotor, and the shrouding effect on the rudder overcome by the use of fairings arranged fore and aft of the auxiliary rotors and blending with the rudder. When such an arrangement is adopted, the required projected area is best obtained by the use of two or more small auxiliary rotors arranged one above the other.

Figure 2:
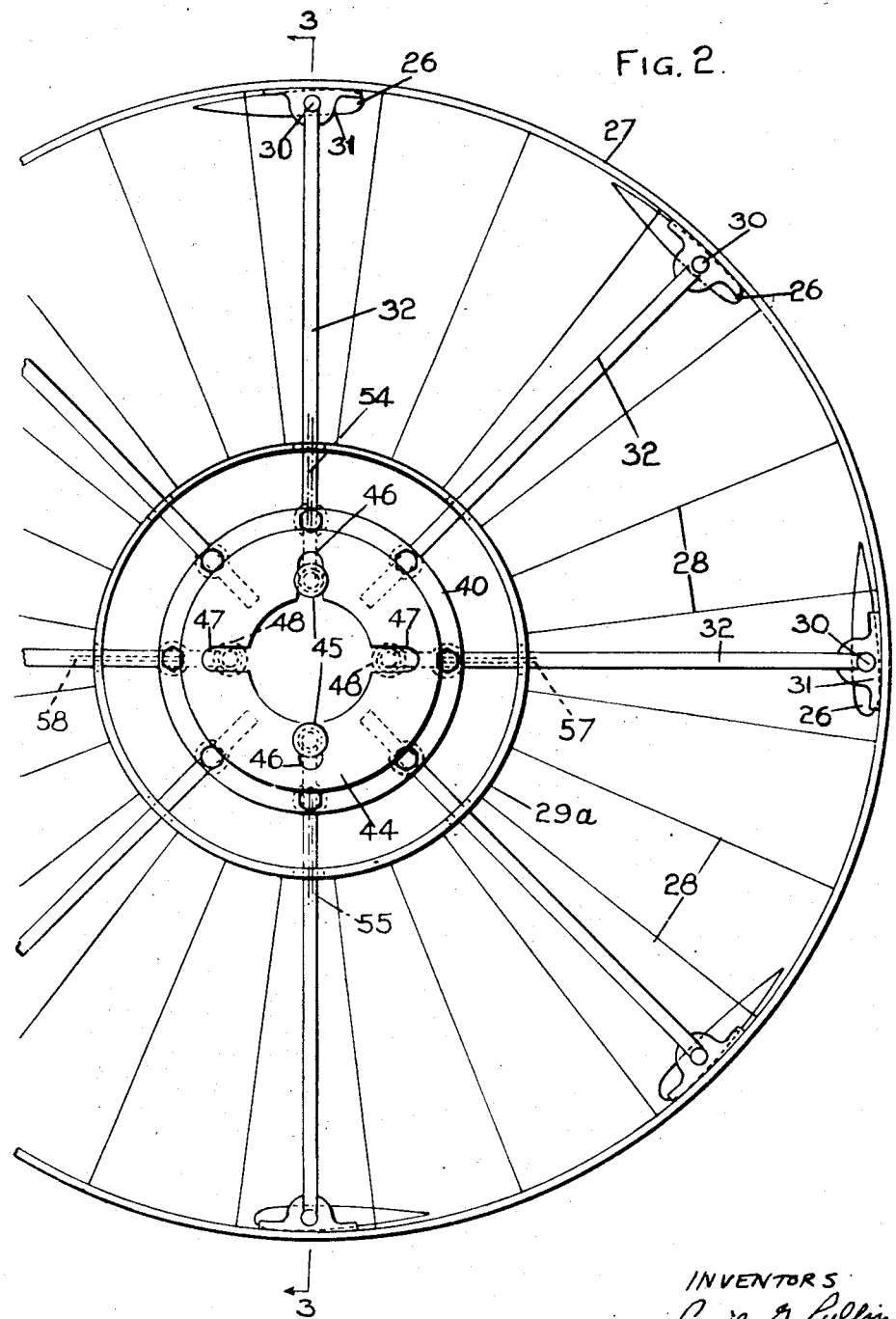
Figure 3:
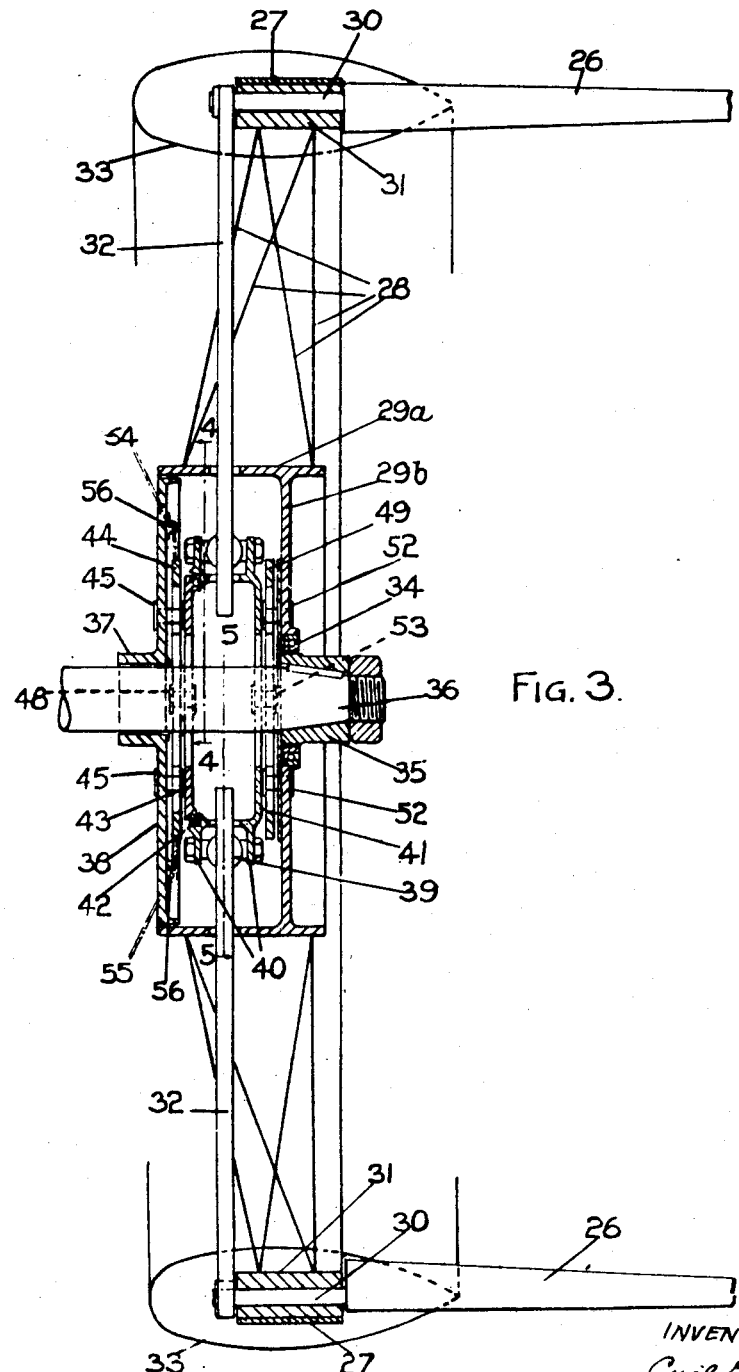
Figure 7:
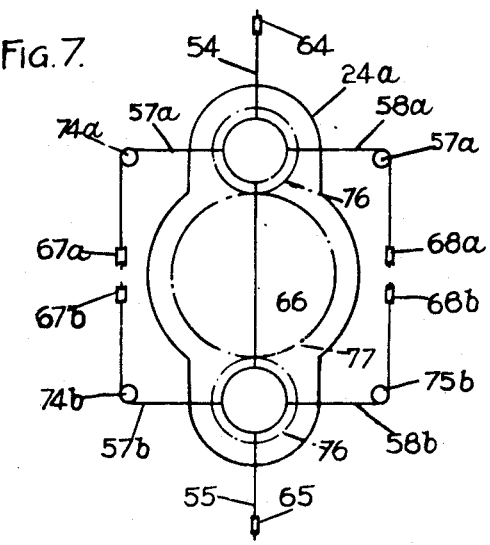
Figure 4:
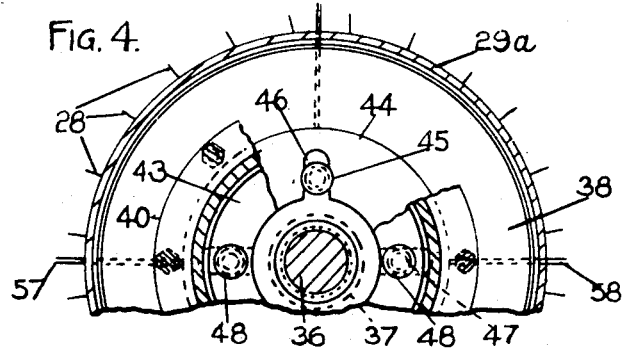
Figure 5:
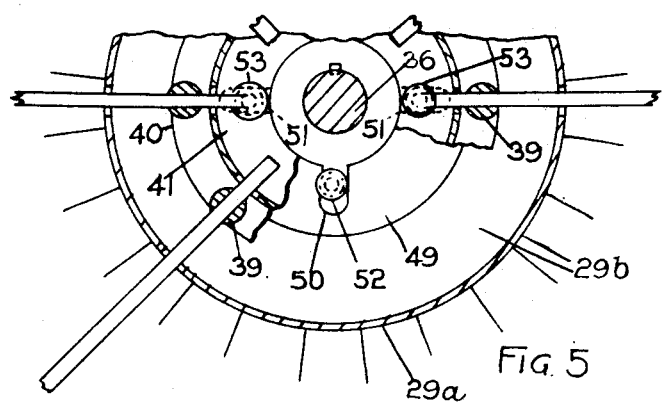

Typical embodiments of the invention are illustrated by way of example in the accompanying drawings, of which:

Fig. 1 is a schematic general arrangement view, in side elevation, of a helicopter embodying one form of the invention, Fig. 2 is an end view of the auxiliary rotor taken in the direction of arrow 2 in Fig. 1, Fig. 3 is a central vertical section of the auxiliary rotor taken along the line 3—3 of Fig. 2, Figs. 4 and 5 are partial sections taken respectively along the lines 4—4 and 5—5 of Fig. 3, Fig. 6 is a schematic general arrangement similar to Fig. 1, of a helicopter embodying a second form of the invention, Fig. 7 is a sectional view taken along the line 7—7 of Fig. 6, on an enlarged scale and showing selected parts only, to illustrate a detail of the construction, and Fig. 8 is a diagrammatic view of certain drive and transmission elements incorporated in the arrangement of Fig. 6.

The helicopter shown in Fig. 1 has a body 10, housing an engine 11, on the rear end of which is a distribution gear box 12, from which is taken an inclined drive shaft 13, the main transmission for driving the lifting rotor comprising a secondary gear box 14, and a final drive shaft 15, which is concentric with the main lifting-rotor hub 16 carrying rotor blades 17 on pivot mountings 18.

Flying control (in the fore-and-aft or pitching, and in the transverse or rolling, senses) is obtained by tilting the rotor hub assembly, in like senses to the tilting of the control column, the mechanism for which as here shown includes a control box 19 containing screw-jack elements operating a lever attached to the axle member of the rotor hub and control circuits 20 and 21 comprising cable-and-pulley or/and chain-and-sprocket gear through which the conventional control column 22 operates the screw-jack elements of the control box 19. It will be observed that the mechanism here shown is similar to that shown, and described in considerable detail, in a British Patent 567,989 (accepted March 13, 1945) and the corresponding Pullin U. S. Patent 2,440,225, granted April 20, 1948, on an application filed May 20, 1944. The operation of this mechanism on the rotor, for longitudinal and lateral control, is on the "instinctive" principle, corresponding to the movements of the control column.

An auxiliary output shaft 23, taken from the distributor gear box 12, and extending rearwardly, enters a reduction gear housing 24 containing reduction gearing through which shaft 23 drives the large single auxiliary paddle-wheel rotor 25 which rotates on a substantially horizontal axis in the fore and aft plane of symmetry and is provided with a number of blades 26, whose spanwise axes are parallel to the axis of rotation of the rotor 25.

The auxiliary rotor, whose construction is illustrated in Figs. 2 to 5, comprises a blade supporting wheel consisting of a rim 27 connected by wire spokes 28 to a hub-shell 29a; and the rim carries blade-bearing brackets 31 rotatably supporting shafts 30 which are parallel to the axis of the hub-shell and rim, and on which the blades 26 are cantilever-mounted. To each shaft 30 is secured a radial rod 32; and the rim structure is enclosed in an annular streamlined fairing 33.

The hub-shell 29a is integrally formed with a hub-disc 29b, whose central boss houses the outer race of a ball-type free-wheel coupling 34; and the inner race of this coupling is carried by an internally tapered collar 35 keyed onto a taper-ended drive shaft 36, driven by the shaft 23 of Fig. 1 through the reduction gearing in the housing 24. The forward end of the hub-shell 29a is closed by a fixed plate 38 formed with a boss 37 having a central opening constituting a steady bearing for the shaft 36.

The rods 32 pass through openings in the hub-shell 29a and slide in ball members 39 which are pivotally supported in flanges 40 integrally formed on an inner shell 41 and extending from it in planes perpendicular to the axis of rotation. The shell 41 has openings to accommodate the ends of rods 32, and the pivotal axes on which the members 39 can turn are parallel to the axis of rotation. The shell 41 rotates with the hub 29a, 29b, and its forward end is closed by a non-rotary plate 43 on which the shell 41 is located by a bearing 42.

The amplitude and phasing of the oscillations of the blades 26 about their span-wise axes, that is about the axes of their pivotal mountings 30, 31 are varied by displacing the shell 41 in a direction perpendicular to its axis. Such a displacement will cause the rods 32 and the blades 26 to which they are fixed to rock about their pivotal mountings 30, 31, the angular and linear displacements of the rods relatively to the shell 41 being accommodated by the sliding and pivoting joints 39. It can be shown that if the shell 41 is so displaced as to become eccentric with the rotor 25 the rods 32 are displaced in such a way that if prolonged they would all pass through a point eccentrically displaced in the same direction as the centre of the shell 41, the distance of this point from the wheel centre being proportional to the eccentricity of the shell 41; the ratio of these distances is the same as that of the radii of the pivotal connections 30, 31 and 39 respectively, taken from the rotor centre. As already mentioned, such a disposition of the rods 32 brings about, when the rotor rotates, an oscillation of the rotor blades of satisfactory wave-form.

To enable the shell 41 to be displaced eccentrically from the hub 29a, 29b, it is connected to the hub plate 29b by an "Oldham" type coupling and a similar coupling connects the non-rotary locating plate 43 with the fixed plate 38. The latter coupling consists of an intermediate plate 44 in which are formed two pairs of slots 46, 47 located on mutually perpendicular diameters (see Fig. 2, in which the plate 38 has been removed, and Fig. 4). Slots 46 are engaged by pins 45 fixed in plate 38 and slots 47 by pins 48 fixed in the locating plate 43. Similarly the hub plate 29b and the shell 41 carry pairs of pins 52, 53 respectively located on mutually perpendicular diameters and engaging pairs of slots 50, 51 formed in an intermediate plate 49 (see Fig. 5).

Vertical displacement of the shell 41 is effected by displacing the intermediate plate 44 vertically, the displacement being transmitted by pins 48; for this purpose cables 54, 55 are secured to the top and bottom edges of plate 44; these cables are led through fairleads 56 and form part of the yawing control circuit, since vertical displacement of the meeting point of rods 32 phases the blade oscillation to produce a transverse thrust whose direction is determined by the direction (upwards or downwards) of the eccentricity of the rod-meeting point and by the direction of rotation of the rotor 25 (see Figs. 2, 3 and 4).

Similarly transverse displacement of the shell 41 giving an upward and downward thrust component is effected by cables 57, 58 forming part of the trimming control circuit and connected to the port and starboard edges of the locating plate 43 (see Figs. 2 and 4).

The cables 54, 55 of the yawing control circuit are led over jockey pulleys 59 to a conventional rudder bar or pedal mechanism 60; and the cables 57, 58 of the trimming control system are led over jockey pulleys 61 to a pulley or sprocket 62 operated by a hand crank 63 (see Fig. 1).

When the yawing and trimming controls are in the neutral position and the locating plate 43 and shell 41 are concentric with the rotor 25 the rotor rotates idly and delivers no thrust. Eccentric displacement of the shell 41 causes the rotor blades to be oscillated about their spanwise axes, once per revolution, with an angular amplitude proportional to the extent of the eccentricity of the shell 41. The phasing of the oscillation is such that the maximum and minimum of the angles of incidence are 90° in advance of the direction in which

We claim:

1. In a helicopter, in combination with a lifting rotor system and a power plant, at least one controllable yaw-moment-producing auxiliary rotor operative in hovering flight and off-set rearwardly from the centre of gravity of the helicopter with its axis in a fore and aft vertical plane and comprising a rotatable wheel structure, a number of blades supported thereon with their spanwise axes extended forwardly and rearwardly and arranged parallel to and evenly spaced about the auxiliary rotor axis, the wheel structure including a mounting for each blade permitting oscillation of the blade about its spanwise axis, and mechanism for oscillating all the blades on their mountings through a limited angle with a frequency of once per revolution of the rotor and with the same amplitude and phasing, and transmission means connecting the power plant with the auxiliary rotor for rotating the latter.

2. In a helicopter, in combination with a lifting rotor system and a power plant, at least one controllable yaw-moment-producing auxiliary rotor operative in hovering flight and off-set rearwardly from the centre of gravity of the helicopter with its axis substantially horizontal and in a fore and aft vertical plane and comprising a rotatable wheel structure, a number of blades supported thereon with their spanwise axes parallel to and evenly spaced about the auxiliary rotor axis, the wheel structure including a mounting for each blade permitting oscillation of the blade about its spanwise axis, and mechanism for oscillating all the blades on their mountings through a limited angle with a frequency of once per revolution of the rotor and with the same amplitude and phasing, and transmission means connecting the power plant with the auxiliary rotor for rotating the latter.

3. In a helicopter, in combination with a lifting rotor system and a power plant, at least one controllable yaw-moment-producing auxiliary rotor operative in hovering flight and off-set rearwardly from the centre of gravity of the helicopter with its axis in a fore and aft vertical plane and comprising a rotatable wheel structure, a number of blades supported thereon with their spanwise axes parallel to and evenly spaced about the auxiliary rotor axis, the wheel structure including a mounting for each blade permitting oscillation of the blade about its spanwise axis, and mechanism for oscillating all the blades on their mountings through a limited angle with a frequency of once per revolution of the rotor and with the same amplitude and phasing, said mechanism including means for varying the amplitude and phasing of the blade oscillations, and transmission means connecting the power plant with the auxiliary rotor for rotating the latter.

4. In a helicopter, in combination with a lifting rotor system and a power plant, at least one controllable yaw-moment-producing auxiliary rotor operative in hovering flight and off-set rearwardly from the centre of gravity of the helicopter with its axis in a fore and aft vertical plane and comprising a rotatable wheel structure, a number of blades supported thereon with their spanwise axes parallel to and evenly spaced about the auxiliary rotor axis, the wheel structure including a mounting for each blade permitting oscillation of the blade about its spanwise axis, and mechanism for oscillating all the blades on their mountings through a limited angle with a frequency of once per revolution of the rotor and with the same amplitude and phasing, said mechanism including means for varying the magnitude and algebraic sign of the amplitude of the component of the blade oscillation whose zero phase is in the axial plane of the auxiliary rotor lying transversely of the helicopter, so as to vary the magnitude and direction of the transverse thrust component of the auxiliary rotor, and transmission means connecting the power plant with the auxiliary rotor for rotating the latter.

5. In a helicopter, in combination with a lifting rotor system and a power plant, at least one controllable yaw-moment-producing auxiliary rotor operative in hovering flight and off-set rearwardly from the centre of gravity of the helicopter with its axis substantially horizontal and in a fore and aft vertical plane and comprising a rotatable wheel structure, a number of blades supported thereon with their spanwise axes parallel to and evenly spaced about the auxiliary rotor axis, the wheel structure including a mounting for each blade permitting oscillation of the blade about its spanwise axis, and mechanism for oscillating all the blades on their mountings through a limited angle with a frequency of once per revolution of the rotor and with the same amplitude and phasing, said mechanism including means for varying the magnitude and algebraic sign of the component of blade oscillation whose zero phase is in the vertical axial plane of the auxiliary rotor, so as to vary the magnitude and direction of the vertical thrust component of the auxiliary rotor; and transmission means connecting the power plant with the auxiliary rotor for rotating the latter.

6. In a helicopter, in combination with a lifting rotor system and a power plant, at least one controllable yaw-moment-producing auxiliary rotor operative in hovering flight and off-set rearwardly from the centre of gravity of the helicopter with its axis substantially horizontal and in a fore and aft vertical plane and comprising a rotatable wheel structure, a number of blades supported thereon with their spanwise axes parallel to and evenly spaced about the auxiliary rotor axis, the wheel structure including a mounting for each blade permitting oscillation of the blade about its spanwise axis, and mechanism for oscillating all the blades on their mountings through a limited angle with a frequency of once per revolution of the rotor and with the same amplitude and phasing, said mechanism including means for varying the magnitude and algebraic sign of the component of blade oscillation whose zero phase is in the vertical axial plane of the auxiliary rotor, so as to vary the magnitude and direction of the vertical thrust component of the auxiliary rotor, together with a manual control member operatively connected to the said means; and transmission means connecting the power plant with the auxiliary rotor for rotating the latter.

7. A helicopter, as claimed in claim 1, characterized by having the forward ends of the auxiliary-rotor blades supported cantileverwise on the mentioned wheel structure with their rearward ends unsupported.

8. A helicopter, as claimed in claim 1, in which the auxiliary-rotor blades are each supported by one end in the mentioned wheel structure and the auxiliary rotor includes an idle wheel structure co-axial with the first-mentioned wheel structure and provided with means for supporting the other ends of the blades, which means permit the blades to oscillate about their spanwise axes, said helicopter having a tail extension carrying the last-named means.

9. In a helicopter, in combination with a lifting rotor system and a power plant, at least one controllable yaw-moment-producing auxiliary rotor operative in hovering flight and off-set rearwardly from the centre of gravity of the helicopter with its axis in a fore and aft vertical plane and comprising a rotatable wheel structure, a number of blades supported thereon with their spanwise axes parallel to and evenly spaced about the auxiliary rotor axis, the wheel structure including a mounting for each blade permitting oscillation of the blade about its spanwise axis, and mechanism for oscillating all the blades on their mountings through a limited angle with a frequency of once per revolution of the rotor and with the same amplitude and phasing, and transmission means including a free-wheel coupling connecting the power plant with the auxiliary rotor for rotating the latter.

10. In a helicopter, in combination with a lifting rotor system and a power plant, at least one controllable yaw-moment-producing auxiliary rotor operative in hovering the shell 41 is eccentrically displaced, with reference to the direction of rotation. Thus in this example, in which the rotor 25 is left headed (as viewed from behind), the minimum incidence position is to starboard when the shell 41 is displaced downwards; and consequently the thrust is to port. Similarly displacement of the shell 41 upwards causes a thrust to starboard; and displacements to port and starboard cause upward and downward thrusts respectively.

Accordingly the connections of the yawing control circuit are made so that pressure on the port pedal 60 pulls the cable 54 and on the starboard pedal pulls cable 55; and the connections of the trimming control circuit are as shown, so that forward rotation of the trimming crank 63 pulls the cable 57 and trims the aircraft by the nose.

In the second embodiment illustrated in Figs. 6 and 7 the single auxiliary rotor 25 with cantilever blades of Fig. 1 is replaced by a pair of smaller rotors with blades supported at both ends, placed one above the other and rotating in the same direction. The two rotors are housed in an extension of the body 10 forming a fixed fin; and the outer skin of this part of the body has openings 73 on each side defining an open space in which the rotors are located.

The top rotor comprises a blade supporting and driving wheel at the forward end of similar construction to that used in the embodiment of Figs. 1 to 5, but without the stream-lined fairing 33; and the rim of this wheel is shown at 27a. The rear ends of the blades 26a are supported in an idler wheel 70a whose shaft 71a is supported in a bearing housing 72a. Similarly the lower auxiliary rotor comprises a front supporting and driving wheel, whose rim is shown at 27b, blades 26b, idler wheel 70b and shaft 71b supported in a bearing housing 72b.

The driving shafts of the twin rotors are driven in the same direction by the auxiliary rotor driving shaft 23 through spur or helical gearing 76, 77 housed in a gear-box 24a (see Fig. 7); and the rear end of the body which constitutes the fixed fin carries a conventional rudder 69.

The control circuits are connected as follows: The yawing control cables 54, 55 connected to the rudder pedal mechanism are respectively taken over jockey pulleys 64, 65 to the top of the intermediate plate of the non-rotative "Oldham" coupling of the top auxiliary rotor and to the bottom of the corresponding intermediate plate of the lower auxiliary rotor and these two intermediate plates are connected together by a cable 66. The cables 54, 55 are also respectively connected by branch cables 54a, 55a to the port and starboard ends of the operating lever of the rudder 69. The cables 57, 58 of the trimming control circuit are each branched, the top branches 57a, 58a respectively being led over jockey pulleys 67a, 74a and 68a, 75a to the port and starboard sides of the inner or locating plate of the non-rotative "Oldham" coupling of the top auxiliary rotor; and the lower branches 57b, 58b being similarly led over jockey pulleys 67b, 74b, and 68b, 75b to the port and starboard sides of the corresponding locating plate of the lower auxiliary rotor (see Fig. 7).

In this embodiment, control in yaw is provided by the conventional rudder when the forward speed of the aircraft is great enough for the rudder to be effective and means are therefore provided for disconnecting the drive of the auxiliary rotors, so that in such conditions they may be stopped or idle. These means consist of a clutch enclosed in the main distribution gear box 12, by which the shaft 23 may be dis-connected and re-connected with the engine; the details of the clutch are not illustrated, being of conventional type, but being shown diagrammatically in Fig. 8 which illustrates in outline certain of the elements incorporated in the transmission housing 12. This clutch, indicated at 23x is operated by an external lever 78 on the gear box 12, connected by a rod 79 with a pilot's clutch lever 80 working in a quadrant 81. Fig. 8 also diagrammatically illustrates the free wheeling clutch 11x in the power shafting 11p of the engine 11.

With respect to both embodiments of the invention: as regards the auxiliary rotor blade oscillation and the appropriate linkages to obtain it, the ideal wave-form of the oscillation (angular displacement against time) can be mathematically derived and appropriate linkages designed to obtain it, but an oscillation of satisfactory wave-form is produced if the plane normal to the chord line of the aerofoil profile of each blade always passes through a fixed line parallel to and offset from the axis of rotation; this can be effected by a simple eccentric mechanism operating on rods rigidly secured to the blades.

For the paddle blades, symmetrical aerofoil profiles are recommended, because the angle of incidence varies from positive through zero to negative and back again in the course of each revolution of the auxiliary rotor.

From the foregoing description of two embodiments of the invention, it will now be clear that among the advantages of the invention are:

(a) The performance of the paddle wheel type rotor being less affected by variation of axial flow component than that of a screw propeller by radial flow variation, the torque compensation is less affected by changes of forward speed of the aircraft.

(b) Reduction of parasite drag is secured (in high speed, cruising and shallow-climb and dive flight) as follows: the axle being in the fore and aft line, the housings of the driving gears and transmission can be "buried" within the fuselage and the axle itself can be cantilevered from bearings also so buried; this cannot be so completely done with the corresponding members of a screw propeller installation: the blades of the paddle wheel offer less drag (to fore and aft flow) when stationary than corresponding screw propeller blades, unless the latter are feathered, provision for which introduces an additional complication; against this is the drag of the supporting wheel frames of the paddle blades, but this can be so minimized by careful design that it is more than offset by saving of drag in other respects mentioned above.

(c) A downward or upward thrust component is readily obtainable; with a screw propeller this can only be done by inclining the axis and requires somewhat complicated and heavy mountings and controls; the ability to apply a downward or upward thrust component obviates to a large extent the need for ballast to compensate changes of operational loading of the aircraft, upward or downward thrust components of useful magnitude can be obtained at small reduction of sideways thrust component, e. g., a downward component of one quarter of the total thrust causes the sideways component to be reduced by only about 3%; and it can be estimated that for a normal design of single rotor helicopter a range of up or down load at the tail of ±¼ of the required torque-reaction-compensating thrust (applied at the same point) is ample to take care of any changes of loading trim within the permissible c. g. limits, so that the necessity for using ballast, with its many inconveniences, can be eliminated.

(d) The ability to control the upward and downward component of the auxiliary rotor with ease provides an effective and powerful means of controlling the aircraft in pitch, the control being effective in hovering and vertical climbing flight; and, as explained in the preceding subparagraph, vertical-thrust-component variations of considerable magnitude (ample for control purposes) are obtainable with negligible variation of the horizontal components.

flight and off-set rearwardly from the centre of gravity of the helicopter with its axis in a fore and aft vertical plane and comprising a rotatable wheel structure, a number of blades supported thereon with their spanwise axes parallel to and evenly spaced about the auxiliary rotor axis, the wheel structure including a mounting for each blade permitting oscillation of the blade about its spanwise axis, and mechanism for oscillating all the blades on their mountings through a limited angle with a frequency of once per revolution of the rotor and with the same amplitude and phasing, and transmission means including a controllable clutch connecting the power plant with the auxiliary rotor for rotating the latter.

11. In a helicopter, in combination with a lifting rotor system and a power plant, at least two controllable yaw-moment-producing auxiliary rotors operative in hovering flight and off-set rearwardly from the centre of gravity of the helicopter and arranged one above another with their axes substantially horizontal and in a fore and aft vertical plane, each auxiliary rotor comprising a rotatable wheel-structure, a number of blades supported thereon with their spanwise axes parallel to and evenly spaced about the auxiliary rotor axis, the wheel structure including a mounting for each blade permitting oscillation of the blade about its spanwise axis, and mechanism for oscillating all the blades on their mountings through a limited angle with a frequency of once per revolution of the rotor and with the same amplitude and phasing; and transmission means connecting the power plant with the auxiliary rotors for rotating the latter.

12. A helicopter, as claimed in claim 2, and including a body which supports the auxiliary rotor, the body having a skin which at least partially shrouds the auxiliary rotor, whose axis lies within the body contour defined by the skin, the latter being provided with openings on each side in way of the auxiliary rotor.

13. A helicopter, as claimed in claim 11, and including a body, which supports the auxiliary rotors, the body having a skin which at least partially shrouds the auxiliary rotors, whose axes lie within the body contour defined by the skin, the latter being provided with openings on each side in way of the auxiliary rotors and shaped to conform to their outline, as projected on a fore and aft vertical plane.

14. A helicopter, as claimed in claim 11, and including a body, which supports the auxiliary rotors, the body having a skin which at least partially shrouds the auxiliary rotors, whose axes lie within the body contour defined by the skin, the latter being provided with openings on each side in way of the auxiliary rotors and shaped to conform to their outline, as projected on a fore and aft vertical plane; and wherein each auxiliary rotor includes, in addition to the mentioned blade supporting wheel structure supporting the rotor blades at one end, an idle wheel structure supporting the rotor blades at their other ends, said idle wheel structures being supported by bearing means carried by the body within its contour as defined by the skin.

References Cited in the file of this patent
UNITED STATES PATENTS

| | | |
|---|---|---|
| 1,922,606 | Voith | Aug. 15, 1933 |
| 2,317,340 | Bennett | Apr. 27, 1943 |
| 2,381,417 | Adams | Aug. 7, 1945 |
| 2,420,784 | Larsen | May 20, 1947 |
| 2,440,225 | Pullin | Apr. 20, 1948 |
| 2,456,942 | Holbrook | Dec. 21, 1948 |

FOREIGN PATENTS

| | | |
|---|---|---|
| 880,360 | France | Dec. 28, 1942 |